(No Model.) 2 Sheets—Sheet 1.
G. M. F. MOLESWORTH.
VEHICLE.
No. 253,085. Patented Jan. 31, 1882.
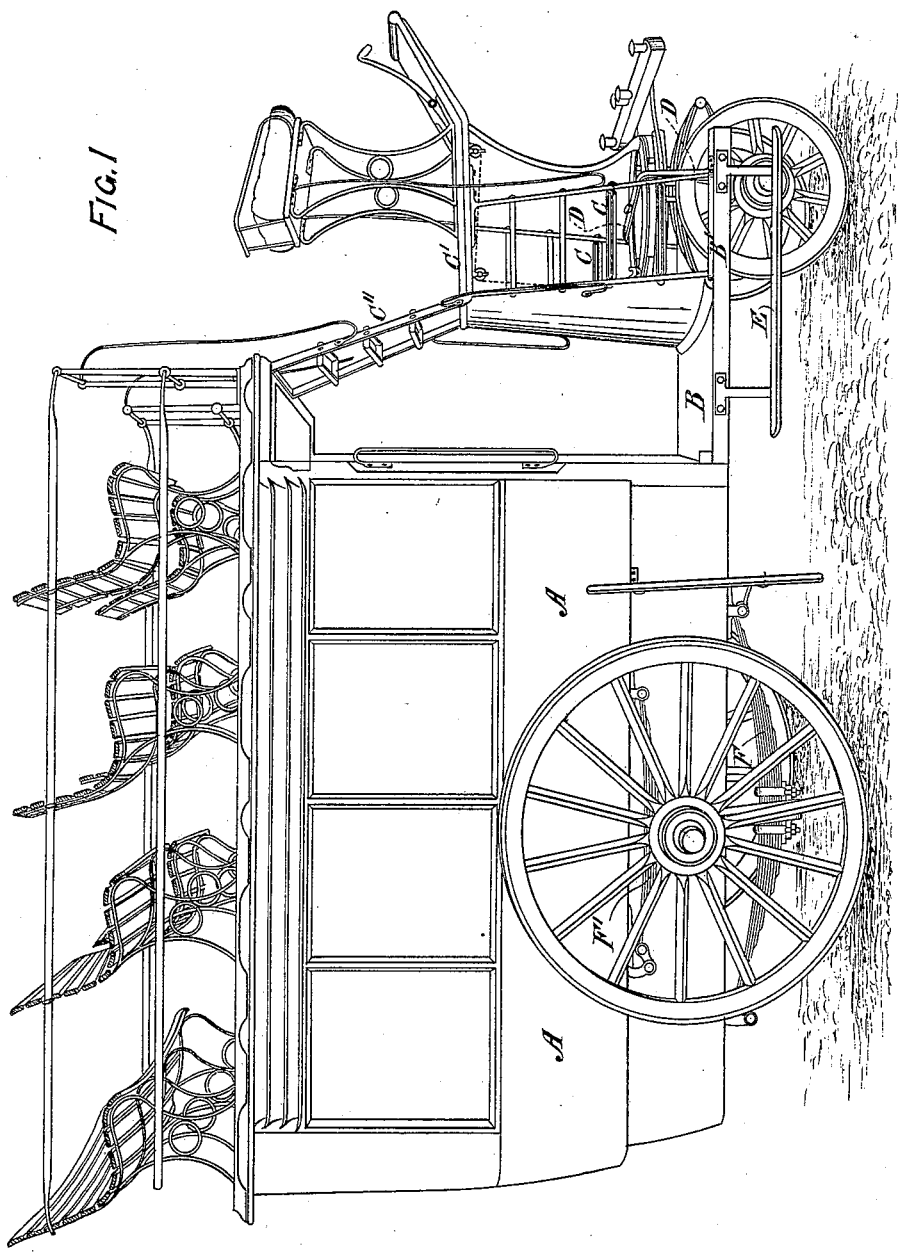
Witnesses.
M. M. Elwee.
Newton Cranford
Inventor
George M. F. Molesworth
pr Henry Orth att'y (No Model.) 2 Sheets—Sheet 2.
G. M. F. MOLESWORTH.
VEHICLE.
No. 253,085. Patented Jan. 31, 1882.
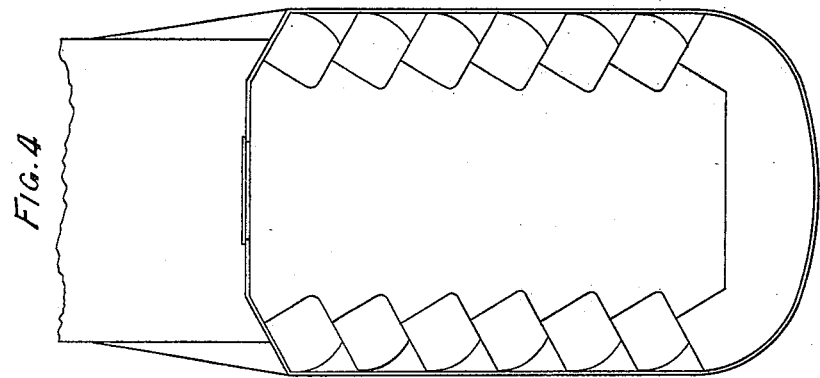
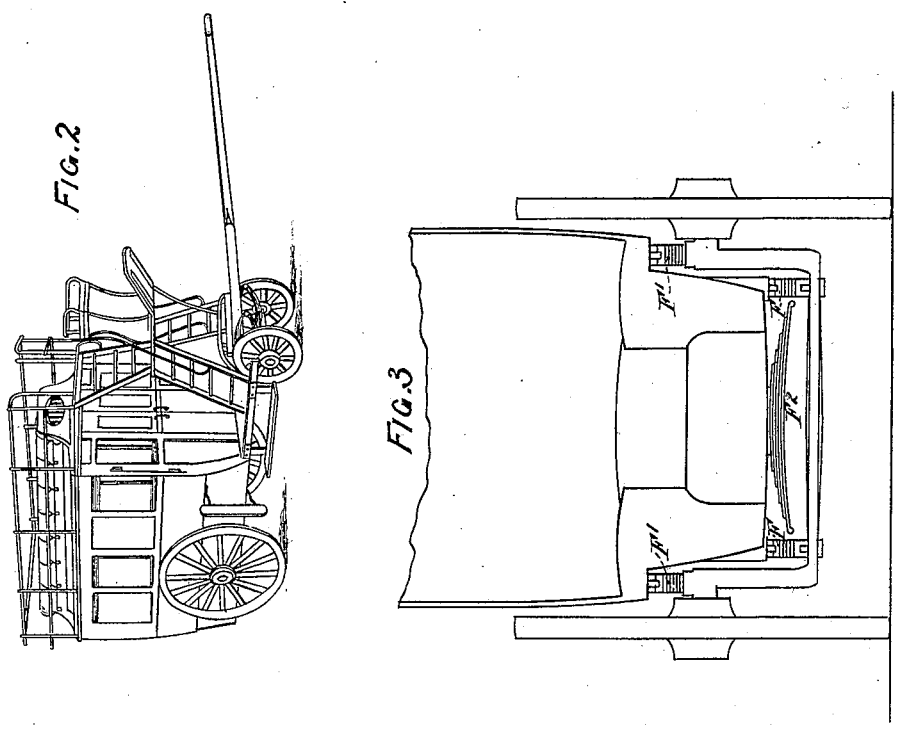
Witnesses.
W. C. McElwee.
Newton Crawford.
Inventor
George M. F. Molesworth
per Henry Orth, att'y
N. PETERS. Photo-Lithographer. Washington, D. C.

UNITED STATES PATENT OFFICE.

GEORGE M. F. MOLESWORTH, OF BIDEFORD, COUNTY OF DEVON, ENGLAND.

VEHICLE.

SPECIFICATION forming part of Letters Patent No. 253,085, dated January 31, 1882.

Application filed September 28, 1881. (No model.) Patented in England August 20, 1880.

*To all whom it may concern:*

Be it known that I, GEORGE MILL FREDERICK MOLESWORTH, a subject of the Queen of Great Britain, residing at Bideford, in the county of Devon, Kingdom of Great Britain, have invented new and useful Improvements in Omnibuses or Vehicles for Use on Common Roads, (for which I have obtained a patent in Great Britain, No. 3,381, bearing date August 20, 1880,) of which the following is a specification.

Reference being had to the accompanying drawings, in which like letters represent like parts, Figure 1 is a side elevation, and Fig. 2 a perspective view on a smaller scale, of the improved vehicle. Fig. 3 is a cross-section through the body, showing the arrangement of springs; and Fig. 4 is a plan of the inside of the vehicle, showing the "staircase" or angular arrangement of the seats.

A is the body of the vehicle, and B the platform; C, the steps up to the top, terminating below upon extensions B' of platform B. D is the bent rod-spring, or equivalent device, secured at each of its ends to the platform projections B', from which it rises vertically, or nearly so, and is then bent, and the center portion lies nearly or quite horizontally, is bossed at the center, and carries the center pin upon which the front axle swivels.

It will be seen (Fig. 1) that the front wheels come up between the extensions B' and rise higher than the level of the platform, which can thus be placed very near the ground—a great advantage in every way over the ordinary construction of omnibus.

The position and shape of the bent bar D are such that the cross-bar or other convenient part of the swiveling frame-work will "lock" against it if the wheels be turned too far round. Nevertheless, the exact shape and position of bar D are practically immaterial, so long as the important advantages of arrangement just described are attained, and except that it is safer and generally more convenient to have a locking device, there is no reason why the front wheels should not be able to swivel entirely round. The foot board or step E lies very near the ground, making access to the vehicle safe and easy.

The general arrangement of the coachman's seat and the steps to the top—viz., two short flights of steps, C, an intermediate platform, C', upon which the driver's seat is erected at a suitable height upon brackets or equivalent, as shown, and from which another, and preferably tapering, short flight of steps, $C^2$, leads to the roof—is clearly shown in Figs. 1 and 2; and it will be noticed that the coachman sits well above his horses, so as to have great command over them, and that the access to the top is much more convenient than usual. The stairs and top may be partly boxed in for ladies' use, if desired.

Figs. 1 and 2 show two different arrangements of the seats on the top, by which the ordinary inconvenient and dirty knife-board seats are dispensed with. The plan adopted in Fig. 2 is similar to that of an ordinary tram-car; but in Fig. 1 the seats are placed across the top, so that everybody faces forward. The back seat extends right across the end; but the others are divided in the center for passage-room, or a side passage may be left. This is clearly shown in the drawings, and the kind of seat shown is an ordinary garden-seat, with wooden cross-bars for back and seat. The exact form and materials for the seats are, however, not important.

The inside seats are shown in Fig. 4, and by constructing them in this staircase form every passenger—except those at the extreme end, who face exactly toward the horses—sits at an angle of forty-five degrees to the side of the vehicle, each as they get farther in a little behind his neighbor and turned partly forward. By this means nobody's knees inconvenience his opposite neighbor's, and a clear passage is left up the center. This method of arranging the seats is applicable to other vehicles besides omnibuses, and would be useful in most cases where the space is confined, such as narrow-gage rail and tram cars. I prefer to employ a sliding door or doors, like those of a tram-car.

The arrangement of springs for carrying the body of the vehicle is shown in Fig. 1 and the cross-section, Fig. 3.

F F are the main bearing-springs, which take the chief weight of the vehicle, and may be secured to the axle in the ordinary way, and to the coach-body by the ordinary link and scroll at the back end, and by a simple bracket and pin in front. The top springs, F', are supplementary ones and tend to steady the whole structure, while the cross-spring F² gives strength and steadiness under a heavy load. By employing so many springs each one can be made lighter than usual, and a peculiarly easy motion is obtained.

Suitable splashers are provided where required.

The large carrying-wheels are placed at or near the center of the longitudinal axis of the vehicle, so that the weight of the body and the passengers is carried almost exclusively by them. By this means the weight upon the front steering-wheels is so slight that they can be turned by one man with ease, which is not the case with those of the ordinary omnibus. Any good and suitable form of brake and connections may be used, as that forms no part of my present invention.

It will be observed that the center of gravity of this vehicle is placed very near the ground; that by the disposition of the wheels it can be turned round in an exceedingly small space; that it weighs little (being, in fact, constructed as lightly as is deemed consistent with safety;) that it is elegant in appearance, unusually free from drafts inside, easy to enter or leave, and simple to construct.

Having now described my invention, what I claim, and desire to protect by Letters Patent, is—

1. In an omnibus or vehicle for use on common roads, the combination, with the coach-body A, of the platform B and extensions B', carrying the bent rod D, said rod and extensions forming a frame-work within which the small wheels, with their carriage and accessories, are free to revolve and swivel, so far as may be expedient, substantially as and for the purposes set forth and shown.

2. In an omnibus or vehicle for use on common roads, the combination, with the coach-body A, platform B, and extensions B', of the lower steps, C, intermediate platform, C', carrying the driver's seat, and upper steps, C², substantially as and for the purposes set forth and shown.

3. In a vehicle of the class described, the combination, with the body A, of the main carrying-wheel axle, located centrally, or nearly centrally, of the longer axis of the vehicle, the main springs F, and the auxiliary springs F², arranged for operation substantially as and for the purposes shown and described.

GEORGE MILL FREDERICK MOLESWORTH.

Witnesses:
ALFRED J. BOULT,
CHAS. BERKLEY HARRIS,
17 *Gracechurch Street, London.*